United States Patent [19]

Laub

[11] 4,044,378
[45] Aug. 23, 1977

[54] OPTICAL SYSTEM FOR REFLECTIVE MODE VIDEO PLAYBACK APPARATUS

[75] Inventor: Leonard J. Laub, Chicago, Ill.

[73] Assignee: Zenith Radio Corporation, Glenview, Ill.

[21] Appl. No.: 628,717

[22] Filed: Nov. 4, 1975

[51] Int. Cl.² .............................................. H04N 5/76
[52] U.S. Cl. .............................. 358/128; 179/100.3 V; 250/201; 350/6; 350/54
[58] Field of Search .......... 178/6.6 DD, 6.6 R, 6.7 A; 179/100.3 V; 250/201, 202; 350/6, 54; 358/128, 130, 132, 127

[56] References Cited

U.S. PATENT DOCUMENTS

| | | | |
|---|---|---|---|
| 3,669,522 | 6/1972 | Anderson | 350/6 |
| 3,771,850 | 11/1973 | Casler | 350/6 |
| 3,829,622 | 8/1974 | Elliot | 179/100.3 V |
| 3,932,701 | 1/1976 | Adler | 178/6.7 A |

OTHER PUBLICATIONS

"University Physics"; by Sears and Zemansky; c 1962 Addison-Wesley Publishing Co., Inc. pp. 779-780.

Primary Examiner—Bernard Konick
Assistant Examiner—Alan Faber
Attorney, Agent, or Firm—Cornelius J. O'Connor

[57] ABSTRACT

An optical system for deriving an output signal from a video disc record that is reflective to a reading beam includes means for directing a reading beam along a predetermined optical path to a reading plane and thence to a light detector. A reading lens, having a back focal plane, is positioned in this optical path to focus the beam on the storage track of the record which is positioned in the reading plane. This lens also returns energy reflected from the record track along the optical path to the light detector. A mirror, which is displaceable about a reference axis, is disposed across the optical path with such reference axis effectively positioned in the back focal plane of the reading lens. A beam-splitter, also disposed across the optical path, is spaced from the mirror in the direction of the light source in order to deflect reflected energy out of the optical path and toward the light detector.

1 Claim, 10 Drawing Figures

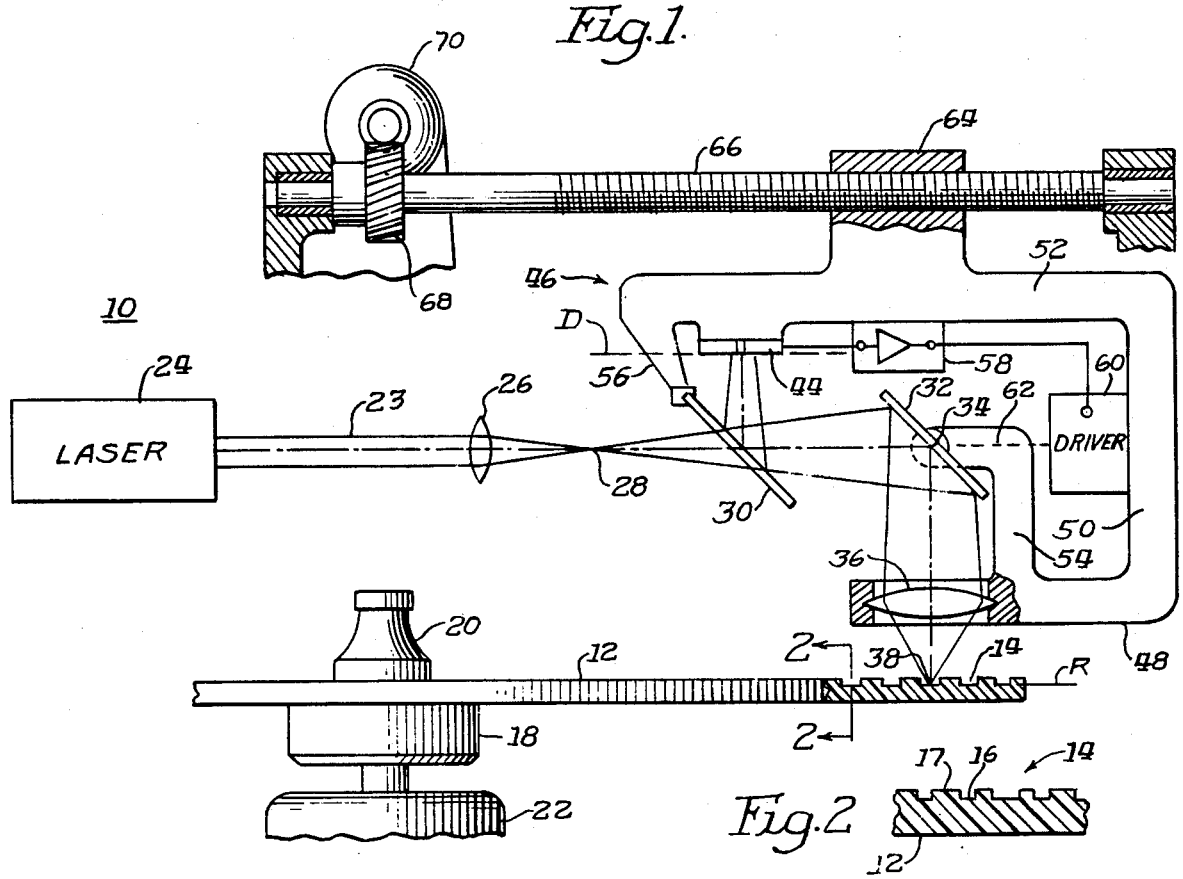
Fig.1.
Fig.2.
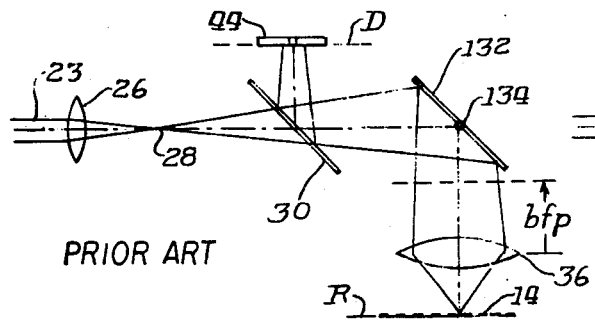
Fig.3a. PRIOR ART
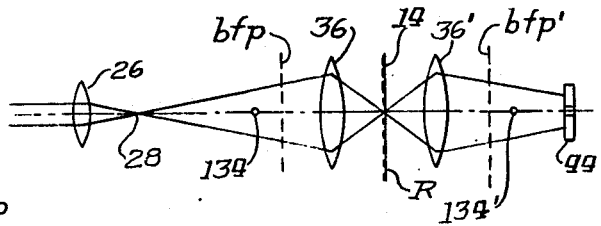
Fig.3b. PRIOR ART
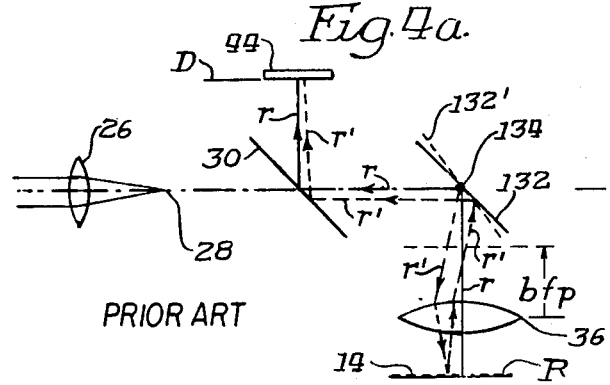
Fig.4a. PRIOR ART
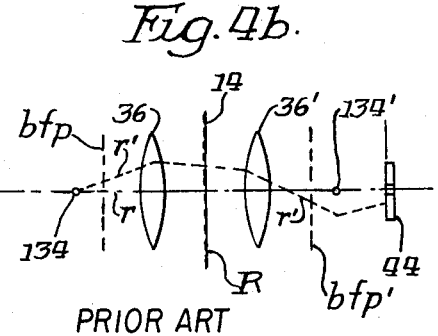
Fig.4b. PRIOR ART

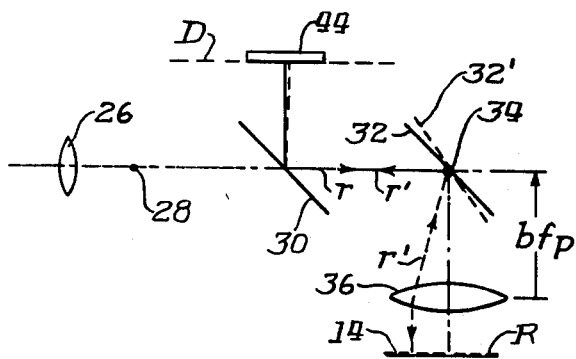
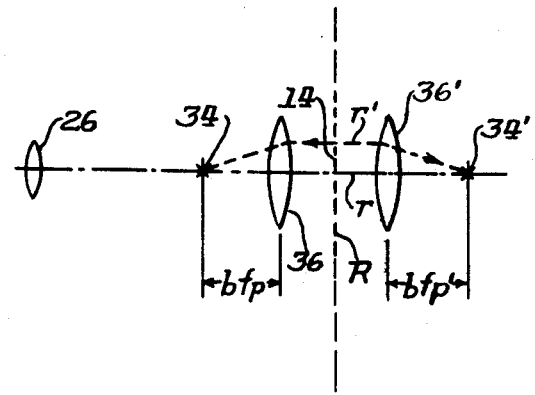
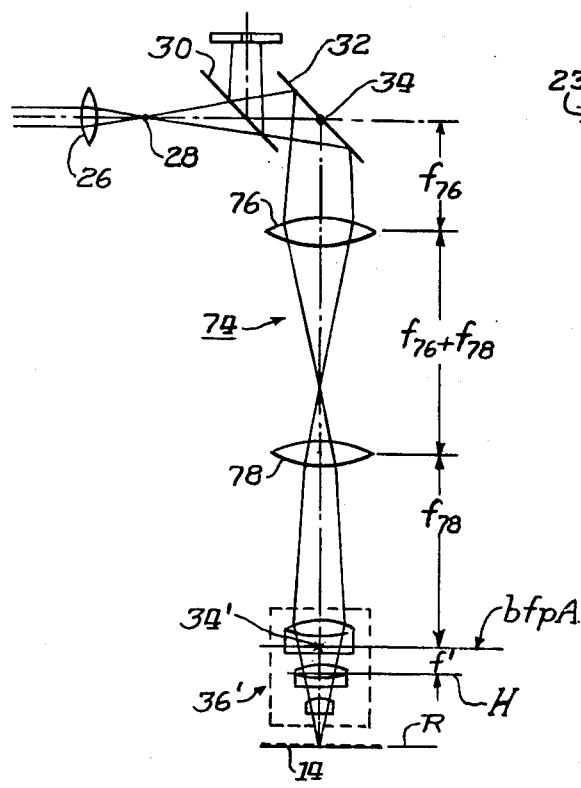
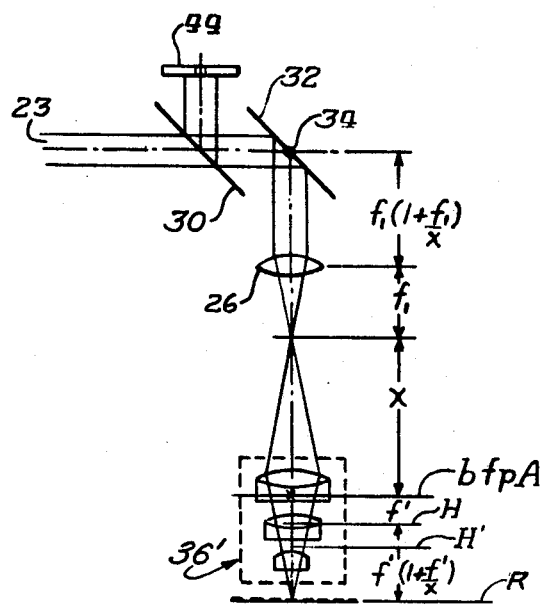

OPTICAL SYSTEM FOR REFLECTIVE MODE VIDEO PLAYBACK APPARATUS

RELATED APPLICATIONS

The subject invention is related to, but is not dependent upon, the invention disclosed and claimed in copending application Ser. No. 450,697, now U.S. Pat. No. 3,952,148, filed Mar. 13, 1974 in the name of Leonard J. laub, which application is assigned to the assignee of the present invention and issued as U.S. Pat. No. 3,952,148 on Apr. 20, 1976.

BACKGROUND OF THE INVENTION

This invention relates in general to an optical system for reading a video disc. More particularly, the invention concerns an improved optical system for deriving a control signal to maintain tracking registration of the reading beam in a reflective mode video disc playback apparatus.

In the field of video information storage and retrieval the video disc record as been proposed as an adjunct to the conventional home color television receiver in order to augment the utility of such a receiver by employing it as a player for recorded video and audio program materials. The program is stored in a medium, such as a vinyl disc, somewhat similar to the familiar audio disc. A record of the type herein considered has the video or other information stored in a spiral track which track physically can take the form of a train of pits and lands. Such a track is intended to by read by a beam of light, preferably a laser beam. The stored program material may include luminance, chroma, audio and synchronizing signals judiciously positioned in segments of the frequency spectrum deemed to be convenient for recording on a disc but, at the same time, subject to transformation to a frequency distribution that is compatible with the type of signal (NTSC) for which the receiver was designed to process. As such, the information stored in the record track preferably features double interlaced fields for each picture frame, with each convolution of the spiral containing two such fields together with requisite synchronizing information.

As noted above, the video information may be stored in a track comprising a succession of pits and lands; on the other hand, the information can be stored in a mechanically generated undulating groove, of a type similar to that employed in conventional audio recordings. In any event, while the invention is equally usable with either type of recording, there appears to be greater promise in the pit and land type of track at the present; accordingly, the invention will henceforth be described in connection with such a track.

In a preferred recording technique the information to be stored is embodied in a baseband signal which is used to frequency modulate a carrier. The modulated carrier is then employed to modulate a laser writing beam that creates, in conjunction with photolithographic techniques, a master recording comprising a spiral track formed of a succession of pits and lands of uniform widths but varying lengths. In a disc record reproduced from such a master, the pits and lands of the track will likewise have uniform widths and also lengths that are variable along the direction of the track so that these pits and lands constitute a spatial representation of the temporal variations of the frequency modulated carrier signal.

The stored information is retrieved by scanning the track with a laser reading beam and utilizing a photoreceptor to respond to the light energy transmitted through or reflected from the track. This light energy is diffracted or modulated in accordance with the information stored in the track. In the situation where the video disc is transmissive to the reading beam, the photoreceptor is located along the beam path and in the far field pattern of the diffracted beam on the opposite side of the record scanned by the beam. Positioned in this manner the photoreceptor collects a portion of the light transmitted through the disc. On the other hand, where the disc is interrogated in a reflective mode, the photoreceptor is located on the same side of the track as the reading beam, again in the far field pattern, to enable it to respond to diffracted light reflected from the track. In either case, the pits and lands serve to diffract or scatter the light of the reading beam so that the photoreceptor, in response to these variations in light intensity, develops an electrical signal bearing modulation which is in accordance with the stored information represented by the pits and lands.

In practice, optical video systems of the type herein considered frequently experience radial tracking erros due to eccentricity of the disc and/or the track which results in mis-registration of the reading beam and the record track. Additionally, time base errors are also encountered when the disc or track is afflicted by eccentricity. These tracking and timing errors are compensated by means of correction apparatus which can take the form of the electro-optical tracking arrangement disclosed and claimed in application Ser. No. 456,918, now U.S. Pat. No. 3,946,166, filed Apr. 1, 1974, in the name of Karl H. Wossidlo and assigned to the assignee of the present invention, now U.S. Pat. No. 3,946,166 which issued Mar. 23, 1976. The aforesaid arrangement includes a mirror which is inserted in the path of the reading beam and which is supported for adjustable displacement about a pair of orthogonally disposed axes coincident with a radial and a tangent to the track at the point where the track is being interrogated. Respective correction signals, indicative of the sense and extent of radial tracking and time base errors, are derived and applied to assigned drivers which serve to tilt the mirror about its orthogonal axes to restore proper tracking and timing.

In the case of radial tracking, an asymmetry in the far field pattern of the diffracted read beam is detectable when the read beam departs from registration with the track. This asymmetry is monitored by a pair of photodiodes which derive a tracking error signal. A particularly attractive photodiode pair arrangement for deriving a radial tracking correction signal is described in copending application Ser. No. 439,680, now U.S. Pat. No. 3,931,459, filed Feb. 4, 1974 in the name of Adrianus Korpel, which application is also assigned to the same assignee as the present invention and issued as U.S. Pat. No. 3,931,459 on Jan. 6, 1976.

Experience has revealed, however, that prior art tracking and time base correction arrangements suffer the undesirable shortcoming of causing a transverse motion of the far field pattern across the photoreceptor during excursions of the tracking mirror. If this motion of the far field pattern produces a positive spurious feedback, then the tracking servo system will be effectively disabled. It is appreciated, however, that some motion of the far field pattern may be unavoidable; in that case, the movement of the pattern should be restricted to a sense which leads to a negative feedback within the tracking servo loop.

Objects of the Invention

Accordingly, it is a general object of the invention to provide an improved optical system for a video disc playback apparatus.

It is a particular object of the invention to provide an optical system for deriving a tracking error correction signal for a video disc playback apparatus.

It is a specific object of the invention to provide, in a video disc playback apparatus, an improved optical system in which transverse motion of the far field pattern across the photodetector during excursions of the tracking mirror is substantially precluded.

SUMMARY OF THE INVENTION

An optical system for deriving an output signal from a video disc record that is reflective to a reading beam comprises a light detector and means for directing a reading beam along a predetermined optical path extending from an energy source to a reading plane and thence to the light detector. A reading lens, comprising an achromat objective having its back focal plane located inside the objective, is positioned in the optical path for focusing the beam on the storage track of a record located in the reading plane. The reading lens also serves to return the energy reflected from the record track along the optical path to the light detector. A mirror, displaceable about a reference axis, is disposed across the optical path with the aforesaid reference axis positioned in the back focal plane of the reading lens. An optical relay is interposed between the mirror and the achromat objective to effectively position the mirror axis in the back focal plane of the achromat objective. This optical relay comprises an intermediate lens for forming a light spot to be projected by the achromat objective onto the record track and for imaging the mirror axis into the back focal plane of the achromat objective. The intermediate lens is spaced from the mirror axis by a distance equal to $f_1[1+(f_1/x)]$, where $f_1$ is the focal length of the intermediate lens and $x$ is the Newtonian back conjugate distance specified for the achromat objective, and is spaced from the achromat objective a distance equal to $f_1 + x + f'$ where $f'$ is the focal length of the achromat objective.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings, in the several figures of which like reference numerals and indicia identify like elements and in which:

FIG. 1 is a fragmentary elevational view of an optical video playback device;

FIG. 2 is a cross-sectional view of a portion of a video disc as viewed along lines 2—2 in FIG. 1 and detailing part of a longitudinal section of a spatially recorded track;

FIG. 3a is a schematic representation of an idealized optical far field detector as used in a reflective video disc player;

FIG. 3b is an unfolded schematic representation of the far field detector shown in FIG. 3a;

FIG. 4a is a schematic representation of the FIG. 3a detector illustrating transverse displacement of the far field pattern due to an excursion of the tracking mirror;

FIG. 4b is an unfolded schematic representation of the FIG. 4a far field detector;

FIG. 5a is a schematic representation of an optical far field detector constructed in accordance with the invention;

FIG. 5b is an unfolded schematic representation of the far field detector shown in FIG. 5a; and FIGS. 6 and 7 are schematic representations of alternate embodiments of an optical far field detector constructed in accordance with the invention.

DESCRIPTION OF THE PREFERRED EMBODIMENT

Referring now more particularly to FIG. 1, the optical playback system 10 depicted therein serves to detect time dependent information signals, for example, video signals, which have been converted to a frequency modulated carrier and spatially recorded upon the surface of a storage medium, such as a record disc 12, which medium preferably comprises a thin foil of polyvinyl chloride. A record commonly used comprises a circular disc which is sufficiently thin, in the order of 4 to 8 mils, to be rotated at a high speed in a technique known as flying. The particular manner in which the information signal is recorded upon the disc is of no concern in that resort may be had to either the mechanical or photolithographic techniques adverted to above. For purposes of discussion it will be assumed that the recorded information adopts the shape of an elongated spiral track 14 comprising a train of pits 16, interspersed with lands 17, impressed in the upper surface of disc 12; for a detail, see the longitudinal section through a portion of track 14 shown in FIG. 2.

Track 14 forms a light diffraction grating which is physically manifested by the spatial pattern of pits and lands formed on the surface of the disc (FIG. 2), which pattern is representative of the modulated carrier signal. The spatial pattern can be said to be established by the totality of the pits forming the track with the spacing, for example, between adjacent pits corresponding to an instantaneous frequency of the modulated carrier.

Turning now to the structural details of system 10, as shown in FIG. 1 disc 12 is supported upon the spindle 18 of a playback deck and secured thereon by a cap 20. The lower extremity of the spindle is coupled to a synchronous motor 22 which serves to rotate the disc through a reading plane R at a predetermined velocity, 1800 RPM when the disc is being flown. Alternatively, the disc may be of sufficient thickness so as to be mechanically rigid. In that case, it would be supported on a turntable (not shown) for rotation, again at 1800 RPM, through the reading plane.

In order to read track 14, optical detection system 10 utilizes a beam 23 of monochromatic coherent light which is produced by a laser 24. The laser may be positioned at any convenient location since the beam therefrom can be directed to the reading plane by mirrors, lenses, etc. The optical system for directing such a beam along an incident optical path to reading plane R includes a lens 26 which focuses the beam to an intermediate spot 28, a beam-splitter 30, a tracking mirror 32, which is displaceable about its reference axis 34, and a final read lens, or objective 36, which focuses the beam to a spot 38 on that portion of track 14 instantaneously being read. Mirror 32, which for the moment will be assumed to be employed for radial tracking correction, is displaceable about its axis 34 under the control of a drive arrangement described below. In accordance with the invention axis 34 is positioned in the back focal plane of read lens 36.

In the case at hand, displacement of tracking mirror 32 about axis 34 shifts the reading beam 23 transversely (either to the left or to the right, as viewed in FIG. 1) of the optical path of the playback apparatus, the specific direction of displacement being determined by the correction desired to be accomplished. Accordingly, rotation of mirror 32 about axis 34 produces a controlled displacement of the beam in either of two directions along a radial of disc 12 to maintain the beam properly centered on the track being read.

On the other hand, to accomplish time base correction, the beam is displaced along a tangent to the track direction, at the point of reading, to achieve either an advance or retardation of the timing parameter. The advantages of the present invention are useful in either case and, indeed, are particularly beneficial in an optical system that features both types of beam displacement for optimum disc playback.

Additionally, the playback apparatus includes a light detector 44, preferably in the form of a pair of photodiodes, which is located adjacent the aforementioned incident optical path. Light detector 44 is disposed in a detection plane D that extends across an extension of the path defined by the reading beam after it is reflected from record track 14. More particularly, the reflected beam energy pursues a path which, for the most part, is coincident with the incident beam path in that this energy returns through lens 36 to be deflected by tracking mirror 32 toward beam-splitter 30. The reflected beam is then deflected out of the incident beam path by the beam-splitter toward detector 44 which is located in the far field pattern of the reflected reading beam.

Attention is now directed to the structural details of system 10 which enable the reading spot formed by objective lens 36 to monitor track 14. Lens 36, tracking mirror 32, beam-splitter 30 and detector 44 are supported upon a carriage 46 for conjoint travel along a path normal to the track and thus coincident with a radius extending from the center of the disc. As shown, lens 36 is carried by the shelf portion 48 of an arm 50 depending from an upper frame member 52 of the carriage. A post 54, supported on shelf 48, captivates tracking mirror 32 above lens 36 for rotation about its reference axis 34. Post 54 is so dimensioned, and located, as to effectively place reference axis 34 of the tracking mirror in the back focal plane of reading lens 36. Beam-splitter 30 is fixedly secured to an offset 56 extending from frame member 52. This frame member also serves to support and position light detector 44 in the far field pattern of the reading beam reflected by the beam-splitter. The output of detector 44 is coupled to a differential amplifier 58 which derives a control signal for application to a driver 60. As shown, amplifer 58 and driver 60 can be physically supported by members 52 and 50, respectively of carriage 46. Driver 60 is coupled to tracking mirror 34 by an arm 62 which is figuratively represented by a broken construction line.

Insofar as the control signal aspect of the above-described tracking mirror drive arrangement is concerned, there is disclosed in the previously mentioned Korpel patent a photodiode pair scheme which, in conjunction with a differential amplifier, derives a radial tracking correction signal having an amplitude representative of the extent of misregistration and a polarity indicative of the sense or direction of misregistration. This control signal may then be applied to a electromagnetic driver of the type disclosed in the above-mentioned Wossidlo patents to effect tracking correction.

Finally, to facilitate a controlled radial displacement of the optical reading apparatus 10 across the disc, carriage 46 includes a housing portion 64 which threadably receives a rotatably mounted lead screw 66. The lead screw is effectively oriented perpendicular to track 14 of the disc to assure accurate radial travel of the lenses, beam-splitter, mirror and light detector. A pinion 68, fitted to one end of the lead screw, couples the lead screw to a driver 70 which can comprise an electric motor and gearing complex designed to coordinate the radial displacement of the carriage with the rotational displacement of the disc.

The prior art arrangement depicted in FIGS. 3a and 3b is illustrative of an optical far field detector functioning under ideal conditions, ideal to the extent that the read beam 23 remains in precise registration with track 14 on the disc. As shown, the incident beam 23 is focused at intermediate point 28 and then transmitted through beam-splitter 30 to tracking mirror 132, supported for rotation about axis 134, which directs the beam to reading lens 36. The back focal plane of lens 36 is designated bfp and is located, as shown in FIGS. 3a and 3b, at a point remote from axis 134 of the tracking mirror. The beam is then focused by lens 36 onto that portion of the record track occupying the reading plane. The light energy reflected from the track returns to mirror 132 by retracing the path of the incident beam. The reflected energy is redirected back along the incident light path, toward the light source until it encounters beam-splitter 30. This device then deflects the returning beam out of the incident beam path onto the photodiode pair 44 which, as illustrated in FIG. 3a as well as in the unfolded schematic representation of FIG. 3b, wherein mirrored ones of the elements are designated by primed like numerals, is disposed in the far field pattern of the beam. However, since it has been assumed that there is proper registration between the read beam and the track, in this instance (FIGS. 3a and 3b), there would be no asymmetry in the far field pattern. As a result the photodiodes would be equally illuminated and no error signal would be derived by the differential amplifier 58 described in connection with FIG. 1.

FIGS. 4a and 4b illustrate the maner in which an excursion of a FIG. 3a–3b prior art tracking mirror, to resolve a tracking error, serves to produce a transverse motion of the far field pattern across the photodetector. More particularly, and with reference to FIGS. 4a and 4b, when a central ray r encounters the tracking mirror 132, when that mirror occupies a position corresponding to zero tracking error, this central ray (solid black line) simply impinges upon the tracking mirror, is then directed through read lens 36 to the disc from which it is reflected and then redirected by mirror 132 to beam-splitter 30 from whence it is directed to photodetector 44.

FIGS. 4a and 4b also depict the situation where the tracking mirror has been displaced to compensate for a tracking misregistration. This displaced position of the mirror is shown in broken construction lines and is identified by reference numeral 132'. In this situation a central ray r' (represented by a dotted line and coincident with ray r until it reaches mirror 132') will, upon leaving mirror 132', be directed toward an outer region of read lens 36 rather than toward the center of that lens. As seen in FIGS. 4a and 4b, ray r' row impinges upon an area of the disc different than the area targeted by ray r. When ray r' is now reflected back to tracking mirror 132', if impinges at a point different from whence it left and, as a consequence, is redirected back to beam-splitter 30 along a path which is displaced from its incoming incident path. The beam-splitter, in turn, deflects ray r' toward photodetector 44 along a path which is displaced from the path defined by ray r. As clearly shown in FIGS. 4a and 4b (again, in FIG. 4b, mirrored ones of the elements are designated by primed like numberals), ray r' demonistrates that a transverse motion of the far field pattern of the beam across the photodetector surface is occasioned by an excursion of the tracking mirror undertaken to correct tracking misregistration. As indicated previously, such transverse motion of the far field pattern can give rise to a positive spurious feedback within the servo tracking loop causing an uncorrectable misregistration between the beam and the desired record track.

Turning now to a system that substantially precludes transverse motion of the far field pattern across the photodetector, attention is directed to the improved optical system of FIGS. 5a and 5b. As depicted therein, the reference axis 34 of tracking mirror 32 is effectively spaced a distance bfp from the reading lens 36 which places axis 34 at the back focal plane of lens 36. With this arrangement, the image 34' of axis 34, after reflection from the disc and repassage through the reading lens, effectively reappears in the plane of axis 34. This is probably better illustrated in the unfolded FIG. 5b drawing wherein the image 34' of the mirror axis is shown spaced from the image 36' of the reading lens by the focal plane distance bfp'. Again, as in FIGS. 3b and 4b mirrored ones of the elements are designated by like primed reference numerals.

Stated in another way, the tracking mirror is imaged onto itself. This imagining phenomenon occurs irrespective of the distance between the read lens and the record track. The effect of this contraint, i.e., locating the axis of the tracking mirror in the back focal plane of the read lens, is to cause the ray of light reflected from the tracking mirror to exhibit no transverse motion, all the way from the tracking mirror through the reformed intermediate spot 28 to the laser. Accordingly, the beam-splitter and the photodetector are free to lie anywhere within that range, i.e., between mirror 34 and the laser, without inducing a positive spurious feedback signal in the tracking servo loop.

In practice an achromat microscope objective 36' is frequently employed as a read lens in video disc optical detection systems of the type herein considered. However, such an objective may not permit the ready access to its back focal plane that is required in practicing the subject invention. An example of such an objective is an Amici microscope objective (see Applied Optics ans Optical Design, Part Two, authored by A.E. Conrady and published by Dover Publications, Inc. of New York in 1960) which comprises three tandemly arranged lens groups, see FIG. 6. As shown, the back focal plane bfpA of the Amici is located inside the objective, thus there is no possibility of physically locating the tracking mirror axis in that focal plane. However, in those situations where use of an achromat objective is still desirable, an optical relay can be inserted into the system to position the tracking mirror axis optically in the proper place.

More particularly, and with reference to FIG. 6, access to the back focal plane of read lens 36' can be achieved by resort to an afocal relay in the form of a telescope 74 focused at infinity. Such a telescope can comprise the lenses 76, 78 which are interposed between tracking mirror 32 and the achromat read lens 36'. In the general case, and as shown in FIG. 6, lens 76 is spaced from tracking mirror axis 34 by a distance equal to its focal length $f_{76}$ while lens 78 is spaced from the image 34' of the tracking mirror axis by the distance of its focal length $f_{78}$. Insofar as their own relationship is concerned, lenses 76 and 78 are spaced apart a distance equal to the sum of their focal lengths. It is to be noted that the back focal plane bfpA of objective 36' is located a distance $f$, the focal length of that objective, from the principal plane H of the objective. Accordingly, and as illustrated in FIG. 6, telescope 74 serves to position the image 34' of the tracking mirror axis precisely in the back focal plane bfpA of the achromat objective 36'. In this fashion the requirement that the axis of the tracking mirror be effectively located in the back focal plane of the read lens is complied with.

Another embodiment of the invention, shown in FIG. 7, uses the intermediate lens 26 not only to form the intermediate spot to be projected by the read objective 36' onto the record but also to image the axis 34 of the tracking mirror 32 into the physically inaccessible back focal plane of objective 36'. This is accomplished by placing the mirror axis 34 a distance $f_1[1+(f_1x)]$ from lens 26 toward the laser, where $f_1$ is the focal length of lens 26 and $x$ is the Newtonian back conjugate distance specified for objective 36'. Lens 26 is placed a distance $f_1+x+f$ from objective 36', where $f$ is the focal length of objective 36'. As in the FIG. 6 embodiment, the back focal plane bfpA of objective 36' is spaced the distance $f$ from principal plane H, as viewed from the laser side of the objective. Additionally, it is to be noted that the reading plane R is spaced the distance $f$ $[(1+f'x)]$ from the principal plane H', as viewed from the reading plane side of the objective. These distances imply that beam 23 shall be collimated, e.g., either emerging directly from a laser or from a beam expanding telescope; small and obvious modifications to these distances are to be made should it be desired to use a diverging or converging beam 23. As explained in the general description, the beam returning from the record will coincide, except for direction of travel, with the input beam after reflection from tracking mirror 32. For this reason, as in the other embodiments, beam-splitter 30 and detector 44 are placed between the laser and the tracking mirror. Especially when beam 23 is collimated, the beam-splitter and detector may be absolutely anywhere in this region, and this region may be arbitrarily long.

In summary there has been disclosed an optical detector system for deriving a tracking error correction signal, which system by virtue of a particular tracking mirror and read lens arrangement precludes transverse motion of the far field pattern across the photodetector and the undesired positive feedback component induced therefrom. While the invention has been described in connection with the derivation of a radial tracking error correction signal, it is appreciated that the invention is as readily applicable in performing tangential or timing error correction free of spurious feedback or interaction.

The above-mentioned patents of Laub, Wossidlo and Korpel disclose related subject matter and relevant portions of their disclosures are intended to be, and are, incorporated herein by this and by the previous references to those applications.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

What is claimed is:

1. In an optical video playback device for scanning the storage track of a video record ot the type that is reflective to a reading beam derived from a source of light energy, an improved optical system for deriving an output signal which comprises:

a light detector;

means for directing a reading beam along a predetermined optical path extending from said energy source to a reading plane and thence to said light detector; a reading lens, comprising an achromat objective have its back focal plane located inside said objective, positioned in said path for focusing said beam on the storage track of a record located in said reading plane and for returning energy reflected from said record track along said path to said light detector;

a mirror, displaceable about a reference axis, disposed across said path with said reference axis effectively positioned in said back focal plane of said reading lens;

an optical relay interposed between said mirror and said achromat objective for effectively positioning said mirror axis in said back focal plane of said achromat objective, said optical relay comprising an intermediate lens for forming a light spot to be projected by said achromat objective onto said record track and for imaging said mirror axis into said back focal plane of said achromat objective, said intermediate lens being spaced from said mirror axis by a distance equal to $f_1 [(1+f_1 x)]$, where $f_1$ is the focal length of said intermediate lens and $x$ is the Newtonian back conjugate distance specified for said achromat objective, and spaced from said achromat objective a distance equal to $f_1 + x + f'$, where $f'$ is the focal length of said achromat objective;

and a beam-splitter also disposed across said path and spaced from said mirror in the direction of said source for deflecting reflected energy out of said path toward said light detector.

* * * * *